United States Patent [19]

Sakoe

[11] 4,326,101
[45] Apr. 20, 1982

[54] SYSTEM FOR RECOGNIZING A WORD SEQUENCE BY DYNAMIC PROGRAMMING AND BY THE USE OF A STATE TRANSITION DIAGRAM

[75] Inventor: Hiroaki Sakoe, Tokyo, Japan
[73] Assignee: Nippon Electric Co., Ltd., Tokyo, Japan
[21] Appl. No.: 175,798
[22] Filed: Aug. 6, 1980
[30] Foreign Application Priority Data Aug. 17, 1979 [JP] Japan .................. 54-104669

[51] Int. Cl.³ .................. G10L 1/00
[52] U.S. Cl. .................. 179/1 SD
[58] Field of Search .................. 179/1 SB, 1 SD; 340/146.3 Q, 146.3 WD

[56] References Cited

U.S. PATENT DOCUMENTS 4,059,725 11/1977 Sakoe .................. 179/1 SD
4,156,868 5/1979 Levinson .................. 179/1 SB

*Primary Examiner*—Mark E. Nusbaum
*Assistant Examiner*—E. S. Kemeny
*Attorney, Agent, or Firm*—Sughrue, Mion, Zinn, Macpeak and Seas

[57] ABSTRACT

Operation of a continuous speech recognition system operable according to the dynamic programming technique, is controlled by a state transition diagram in compliance with which word sequences to be recognized by the system with reference to a predetermined number of reference words $B^n$'s are pronounced. The system comprises a state transition table accessed by the reference words $B^n$'s to successively produce particular states y's in the diagram and previous states z's for each particular state y. In cooperation with a recurrence value and an optimum parameter table, a matching unit determines a recurrence value $T_y(m)$ and an optimum parameter set $ZUN_y(m)$ according to:

$$T_y(m) = \min_{z, u, n} \text{ or max } [T_z(u) + D(u, m, n)]$$

and

$$ZUN_y(m) = \arg\min_{z, u, n} \text{ or max } [T_z(u) + D(u, m, n)],$$

where u and m represent an end and a start point of a fragmentary pattern A(u, m) of an input pattern A representative of a word sequence and D(u, m, n), a similarity measure between the fragmentary pattern A(u, m) and a reference word $B^n$ assigned to a permutation of the previous and the particular states z and y. By referring to the optimum parameter table and, as the case may be, to the recurrence value table, a decision unit recognizes the word sequence as a concatenation of optimum ones of the reference words $B^n$'s.

1 Claim, 11 Drawing Figures

| n | y | z |
|---|---|---|
| 1 | 3 3 3 | 0 1 2 |
| 2 | 3 3 3 | 0 1 2 |
| ⋮ | ⋮ | |
| 9 | 3 3 3 | 0 1 2 |
| 10 | 2 2 | 0 1 |
| 11 | 2 2 | 0 1 |
| ⋮ | ⋮ | |
| 18 | 2 2 | 0 1 |
| 19 | 1 | 0 |
| 20 | 1 | 0 |
| ⋮ | | |
| 27 | 1 | 0 |
| 28 | f f f | 1 2 3 |

SYSTEM FOR RECOGNIZING A WORD SEQUENCE BY DYNAMIC PROGRAMMING AND BY THE USE OF A STATE TRANSITION DIAGRAM

BACKGROUND OF THE INVENTION

This invention relates to a continuous speech recognition system for automatically recognizing by the use of the technique of dynamic programming a word sequence substantially continuously spoken in compliance with a regular grammar, or the grammar of regular languages, known in the art.

A continuous speech recognition system is advantageous for use as a device for supplying data and/or program words to an electronic digital computer and a device for supplying control data to various apparatus. An example of the continuous speech recognition systems that are already in practical use, is disclosed in U.S. Pat. No. 4,059,725 issued to Hiroaki Sakoe, the present applicant and assignor to the present assignee. In order to facilitate an understanding of the instant invention, the system will briefly be described at first.

A continuous speech recognition system of the type revealed in the referenced patent recognizes a sequence of spoken word or words with reference to a predetermined number N of individually pronounced words, which are preliminarily supplied to the system as reference words. The word sequence is supplied to the system as an input pattern A defined by a time sequence of first through I-th input pattern feature vectors $a_i$ ($i = 1, 2, \ldots, I$) as:

$$A = a_1, a_2, \ldots, a_I. \tag{1}$$

The reference words are selected to cover the words to be recognized by the system and are memorized in the system as first through N-th reference patterns $B^c$ ($c = 1, 2, \ldots, N$). An n-th reference pattern $B^n$ (n being representative of each of c) is given by a time sequence of first through $J^n$-th reference pattern feature vectors $b_j{}^n$ ($j^n = 1, 2, \ldots, J^n$) as:

$$B^n = b_1{}^n, b_2{}^n, \ldots, b_{J^n}{}^n. \tag{2}$$

Merely for simplicity of denotation, the vectors will be denoted by the corresponding usual letters, such as $a_i$ and $b_j{}^n$, and the affixes c and n will be omitted unless it is desirable to resort to the more rigorous expressions for some reason or another. The input pattern feature vectors $a_i$ are derived by sampling the input pattern A at equally spaced successive instants i. Similarly, the reference pattern feature vectors $b_j$ are arranged at equally spaced sampling instants j. It is therefore possible to understand that the input and the reference pattern feature vectors $a_i$ and $b_j$ are on the respective time axes i and j. As the case may be, the reference pattern will be referred to merely as the reference words.

A fragmentary pattern $A(u, m)$ is defined by:

$$A(u, m) = a_{u+1}, a_{u+2}, \ldots, a_m,$$

where u and m are called a start and an end point of the fragmentary pattern $A(u, m)$. It is possible to select each of the successive instants i as the end point m. Usually, the start point u is a previous instant that precedes the end point m in a sequence of successive instants i. The fragmentary pattern $A(u, m)$ is named a partial pattern in the patent being referred to, without any difference from the partial pattern that will be described in the following.

At any rate, the fragmentary pattern $A(u, m)$ is for comparison with each reference pattern $B^n$. Inasmuch as a length or duration $J^n$ of the reference pattern $B^n$ is dependent on the reference word for that reference pattern $B^n$, it is necessary to carry out the comparison with a plurality of fragmentary patterns selected from the input pattern A. It is conveienet for application of the dynamic programming technique to the comparison to temporarily set the end point m at each of the successive instants i and to vary the start point u relative to the end point m. It is sufficient that the start point u be varied within an interval defined by:

$$m - J^n - r \leq u \leq m - J^n + r, \tag{3}$$

where r represents a predetermined integer that may be about 30°/o of the reference pattern length $J^n$. The integer r is known as a window length or width in the art. Such fragmentary patterns having a common end point m and a plurality of start points u's in the interval (3) will herein be called a group of fragmentary patterns and designated by $A(u, m)$'s. In other words, the group of fragmentary patterns $A(u, m)$'s is defined, by each instant m and the previous instants u's, as those parts of the input pattern feature vector sequence which consist of $(u+1)$-th through m-th input pattern feature vectors $a_{u+1}$'s to $a_m$.

In order to quantitatively carry out the comparison, a group of similarity measures $D(u, m, c)$ or $D(A(u, m), B^c)$ is calculated between each group of fragmentary patterns $A(u, m)$'s and every one of the reference patterns $B^c$. It is convenient for this purpose to individually calculate a subgroup of similarity measures $D(u, m, n)$'s between the group of fragmentary patterns $A(u, m)$'s and each reference pattern $B^n$. An elementary similarity measure $D(u, m, n)$ between the fragmentary pattern $A(u, m)$ and the reference pattern $B^n$ may be defined by:

$$D(u, m, n) = \min_{j=j(i)} \left[ \sum_{i=u+1}^{m} d(i, j) \right], \tag{4}$$

where $j(i)$ represents a monotonously increasing function for mapping or warping the reference pattern time axis j to the input pattern time axis i. The first and the last feature vectors $a_{u+1}$ and $a_m$ of the fragmentary pattern $A(u, m)$ should be mapped to the first and the last feature vectors $b_1{}^n$ and $b_{J^n}{}^n$ of the reference pattern $B^n$ under consideration, respectively. In Equation (4), $d(i, j)$ represents Euclidean distance between an i-th input pattern feature vector $a_i$ and a $j^n$-th reference pattern feature vector $b_{j^n}{}^n$. That is:

$$d(i, j) = |a_i - b_j{}^n|.$$

A partial similarity $D<u, m>$ and a partial recognition result $N<u, m>$ are calculated according to:

$$D<u, m> = \min_c D(u, m, c)$$

and $$N<u, m> = \arg\min_c D(u, m, c),$$

for each similarity measure group $D(u, m, c)$. With the end point m successively shifted towards the input pattern end point I, partial similarities $D<u, m>$'s and partial recognition results $N<u, m>$'s are calculated and stored in memories at addresses specified by m and u.

It is possible to represent the input pattern A by various concatenations of partial patterns $A(u(x-1), u(x))$. A y-th partial pattern $A(u(y-1), u(y))$ in each concatenation is a fragmentary pattern $A(u, m)$ having the start and the end points u and m at points or instants $u(y-1)$ and $u(y)$. The start point $u(y-1)$ is the end point of a $(y-1)$-th partial pattern $A(u(y-2), u(y-1))$ in that concatenation. End points $u(x)$ of x-th partial patterns $A(u(x-1), u(x))$ in a concatenation will be called x-th segmentation points of that concatenation.

The number of partial patterns $A(u(x-1), u(x))$ in a partial pattern concatenation will be designated by k. When the number k is equal to unity, the concatenation is the input pattern A per se. In general, a partial pattern concatenation consists of first through k-th partial patterns $A(u(0), u(1))$ or $A(0, u(1))$, $A(u(1), u(2))$, ..., $A(u(y-1), u(y))$, ..., and $A(u(k-1), u(k))$ or $A(u(k-1), I)$.

One of such partial pattern concatenations would be indentical with a concatenation of those of the reference patterns $B^c$ which are representative of the word sequence under consideration. The number of segmentation points k in such a partial pattern concatenation will be named an optimum number and denoted by $\hat{k}$. The segmentation points for the partial pattern concatenation are called first through k-th optimum segmentation points $\hat{u}(x)$ ($x=1, 2, \ldots, \hat{k}$). The zeroth and the $\hat{k}$-th optimum segmentation points $\hat{u}(0)$ and $\hat{u}(\hat{k})$ are the input pattern start and end points O and I.

For each partial pattern cocatenation, a sum of the memorized partial similarities $D<u(x-1), u(x)>$ is calculated. The optimum segmentation points $\hat{u}(x)$ are determined as a set of segmentation points $u(x)$, $\hat{k}$ in number, that gives a minimum of such sums. Namely:

$$\min_{k, u(x)} \left[ \sum_{x=1}^{k} D<u(x-1), u(x)> \right].$$

Optimum partial recognition results $\hat{n}<\hat{u}(x-1), \hat{u}(x)>$ are selected by the use of the optimum segmentation points $u(x)$ of the optimum number k from the memorized partial recognition results $N<u, m>$'s. A concatenation of the optimum partial recognition results $\hat{n}<\hat{u}(x-1), \hat{u}(x)>$ gives the results of recognition of the word sequence under consideration as an optimum concatenation of optimum ones of the reference words $\hat{n}(x)$, where $x=1, 2, \ldots,$ and $\hat{k}$.

As described in the referenced patent, the algorithm for calculating Equation (4) according to the technique of dynamic programming is given by a recurrence formula for a recurrence coefficient $g(i, j)$. The recurrence formula may be:

$$g(i, j) = d(i, j) + \min \begin{bmatrix} g(i+1, j) \\ g(i+1, j+1) \\ g(i+1, j+2) \end{bmatrix}. \quad (5)$$

For each end point m, the recurrence formula (5) is calculated from $j=J$, successively through $(J-1)$, $(J-2), \ldots,$ and 2, down to $j=1$. The initial condition is:

$$g(m, J) = d(m, J).$$

It is sufficient that the value of i be varied only within a window defined by:

$$j+m-J^n-r \leq i \leq j+m-J^n+r.$$

The subgroup of similarity measures $D(u, m, n)$'s for the end point m and the reference pattern $B^n$, both under consideration, and for various start points u's in the interval (3), is thereby calculated according to:

$$D(u, m, n) = g(u+1, 1).$$

In the cited patent, the technique of dynamic programming is applied also to minimization of the above-described sums with respect to the numbers k's of partial patterns $A(u(x-1), u(x))$ in various concatenations and to the segmentation points $u(x)$ in each of such concatenations. The latter technique of dynamic programming, as modified for implementation of the present invention, will become clear as the description proceeds.

On the other hand, recent trends in development of the continuous speech recognition systems are towards systems operable as automata for recognizing word sequences pronounced as regular languages. Systems operable as automata are described, for instance, by S. E. Levinson in "The Bell System Technical Journal," Vol. 57, No. 5 (May–June 1978), pages 1627–1644, under the title of "The Effects of Syntactic Analysis on Word Recognition Accuracy."

It is possible to understand that a continuous speech recognition system revealed in patent application Ser. No. 58,598 filed July 18, 1979, by Hiroaki Sakoe now U.S. Pat. No. 4,286,115, the instant applicant and assignor to the present assignee, is an approach to an automaton capable of recognizing regular language word sequences. The system disclosed in the referenced patent application is effective in raising the accuracy of recognition. The system is, however, operable only for recognition of word sequences for which transition of states of a finite-state automaton can take place along a single chain as will again be discussed later with reference to one of nearly a dozen of figures of the accompanying drawing. In other words, the system is operable according to a specific state transition diagram alone.

Incidentally, finite-state automata per se are written in "Computation; Finite and Infinite Machines" authored by Marvin Minsky and published 1967 by Prentice-Hall, Eaglewood Cliffs, N. J., pages 11–29.

SUMMARY OF THE INVENTION:

It is therefore an object of the present invention to provide a continuous speech recognition system operable as a general finite-state automaton.

It is another object of this invention to provide a continuous speech recognition system of the type described, which is capable of recognizing a word sequence supplied thereto in compliance with a regular grammar, namely, the grammar of regular languages.

It is still another object of this invention to provide a continuous speech recognition system of the type described, which is operable according to a general state transition diagram.

According to this invention, there is provided a continuous speech recognition system or recognizing a word sequence which is substantially continuously spoken in compliance with a regular grammar and supplied to the system as an input pattern A defined by a time sequence of first through I-th input pattern feature vectors $a_i$ arranged at equally spaced successive instants i ($i = 1, 2, \ldots, I$). The regular grammar is defined by a state transition diagram for an initial state and a finite sequence of possible states x. The finite sequence next follows the initial state. The system comprises a reference word memory, similarity measure calculating means, a state transition table, a recurrence value and an optimum parameter table, optimum parameter determining means, and deciding means.

The reference word memory is for memorizing flat through N-th reference words $B^c$ ($c = 1, 2, \ldots, N$). An n-th reference word $B^n$ (n being representative of each of c) is given by a time sequence of first through $J^n$-th reference word feature vectors $b_j^n$ ($j^n = 1, 2, \ldots, J^n$).

The similarity measure calculating means is for calculating at each instant m (m being representative of each of i) a group of similarity measures D(u, m, c) between a group of fragmentary patterns A(u, m)'s and every one of the reference words $B^c$. The group of fragmentary patterns A(u, m)'s is defined, by the above-mentioned each instant m and a plurality of previous instants u's preceding that instant m among the successive instants i, as those parts of the input pattern feature vector sequence which consist of (u+1)-th through m-th input pattern feature vectors $a_{u+1}$'s to $a_m$.

The state transition table is for memorizing, in connection with a particular state y (y being representative of each of x) a previous state z and a set of words $P_{zy}$ for a permutation of the previous and the particular states z and y. The previous state z is each of that at least one of the initial and the possible states x which precedes the particular state y. The word set $P_{zy}$ is preselected from the reference words $B^c$ according to the permutation.

Each of the recurrence value and the optimum parameter tables comprises a plurality of memory locations two dimensionally accessible by the successive instants i and the possible states x.

The optimum parameter determining means is for repeating calculation of a recurrence value $T_y(m)$ and determination of a set of optimum parameters $ZUN_y(m)$ at the above-mentioned each instant m and for the particular state y and storage of the recurrence value $T_y(m)$ and the optimum parameter set $ZUN_y(m)$ in the recurrence value and the optimum parameter tables, respectively, at memory locations accessible by the above-described each instant m and the particular state y. The recurrence value $T_y(m)$ is calculated as a minimum of a plurality of sums of previous recurrence values $T_z(u)$'s and those of similarity measures D(u, m, c) of the group, respectively, which are calculated for the reference word belonging to the word set $P_{zy}$. The previous recurrence values $T_z(u)$'s are those calculated at the respective previous instants u's and for the previous state z and stored in the recurrence value table at memory locations accessible by the previous instants u's and the previous state z. The set of optimum parameters $ZUN_y(m)$ are that one each of all the previous state z for the particular state y, the previous instants u's, and the reference words belonging to the word set $P_{zy}$ for which the minimum is calculated.

The deciding means is for deciding a concatenation of reference words from the reference words stored in the optimum parameter table as the word sequence with reference to the sets of optimum parameters $ZUN_y(m)$'s stored in the optimum parameter table.

In connection with the continuous speech recognition system specified hereinabove, it should be noted that the word set $P_{zy}$ consists of a single one of the reference words $B^c$ depending on the permutation.

DESCRIPTION OF THE PREFERRED EMBODIMENTS

Figure 1:
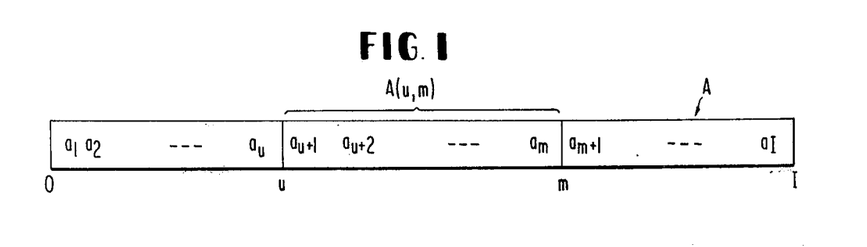
FIG. 1 is a diagrammatic time chart of an input pattern for use in describing a fragmentary pattern.
Figure 2:
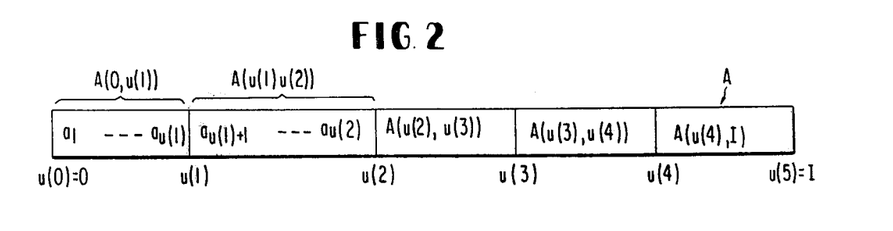
FIG. 2 is another diagrammatic time chart of the input pattern depicted in FIG. 1, for use in describing a concatenation of partial patterns.

Referring to FIGS. 1 and 2, a word sequence to be recognized by a continuous speech recognition system according to the present invention is supplied thereto as an input pattern A defined by a time sequence of first through I-th input pattern feature vectors $a_i$ in Equation (1). This applies to each reference word $B^n$ given by a time sequence of first through $J^n$-th reference word feature vectors $b_j^n$ in Equation (2). A fragmentary pattern A(u, m) is considered only in connection with the input pattern A as exemplified in FIG. 1. A concatenation of first through k-th partial patterns A(u(x−1), u(x)) is used only in connection with the input pattern A as illustrated in FIG. 2 for k=5.

Figure 3:
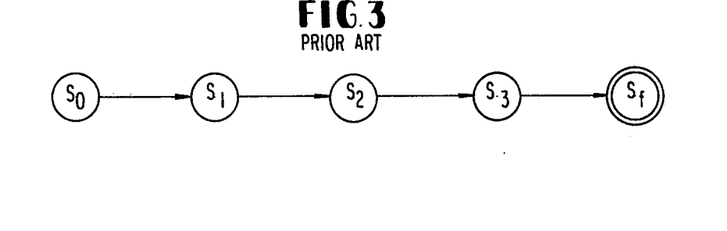
FIG. 3 is a state transition diagram of states assumed by a continuous speech recognition system revealed in patent application Ser. No. 58,598 referred to hereinabove.

Referring to FIG. 3, it is possible to understand that a continuous speech recognition system revealed in patent application Ser. No. 58,598 cited hereinabove, is a specific one of finite-state automata. The automaton is always put successively in an initial state $S_O$ and a finite sequence of possible states, such as first through third and final possible states $S_1$, $S_2$, $S_3$, and $S_f$. State transition is possible only along a single chain.

Figure 4:
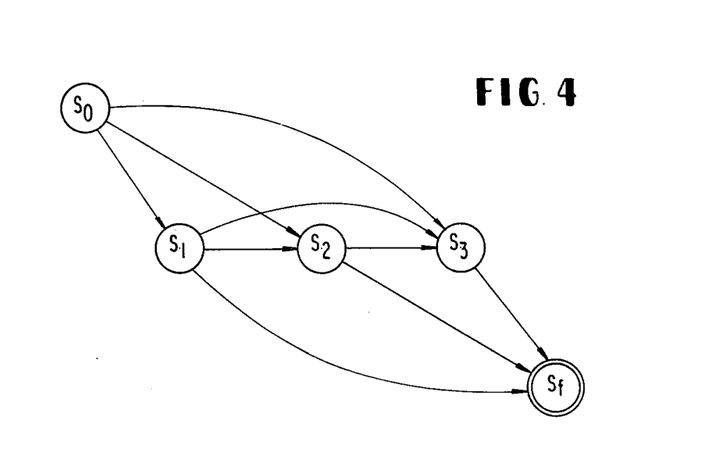
FIG. 4 is a state transition diagram of states which can be assumed by a continuous speech recognition system according to an embodiment of the instant invention.

Turning to FIG. 4, a continuous speech recognition system according to an embodiment of this invention is a far more generalized finite-state automaton. In FIG. 4, state transition is possible from an initial state $S_O$ to any one of first through third possible states $S_1$, $S_2$, and $S_3$, and eventually to a final possible state $S_f$. In the initial state $S_O$, the automaton is ready for recognition of a word sequence. It is only necessary that state transition should take place in the order of the first through the third possible states $S_1$ to $S_3$ if at least two of such possible states should be assumed by the automaton and that the final possible state $S_f$ should be always assumed at the end of state transition. In this sense, the possible states $S_1$ to $S_3$ and $S_f$ form a finite sequence that next follows the initial state $S_O$ as in FIG. 3.

By way of example, let the continuous speech recognition system be for recognition of those up to four-digit prices of sales which are pronounced as, for example, "nine thousand fifty dollars" for $9,050 rather than as "nine oh five oh dollars." Merely for brevity of description, it is assumed throughout the illustration with reference to the accompanying drawing figures that the prices are expressed in terms of ten dollars. When supplied with a figure in the thousand's digit, the automaton is put into the first possible state $S_1$. When supplied with figures in the hundred's and the ten's digits, the automaton is put in the second and the third possible states $S_2$ and $S_3$, respectively, either directly from the initial state $S_O$ or through, for example, the first possible state $S_1$. When supplied with the word "dollars," the automaton is finally put in the final possible state $S_f$. Transition from a state to another is possible as indicated by a line with an arrowhead.

In a state transition diagram, such as exemplified in FIG. 4, the line indicative of the possible transition is referred to in the art as a path. Each possible state to which attention is directed, is herein called a particular state. Each state from which transition to a particular state is possible, is herein named a previous state for that particular state. The initial state $S_O$ is a previous state for each of the first through the third possible states $S_1$ to $S_3$. The first through the third possible states $S_1$ to $S_3$ are previous states for the final possible state $S_f$.

On generally describing an automaton, the possible states are herein denoted by x representative of serial numbers, the final one f inclusive, in the finite sequence. This is because it is possible to number the actually spoken words and hence the optimum reference words $\bar{n}(x)$ in the optimum concatenation by the serial numbers x although the numbers x for the optimum concatenation may not always vary consecutively as will later be exemplified more specifically. A particular and a previous state are designated by y and z, respectively. The initial state $S_O$ is a previous state $z=0$ for a particular state $y=1, 2$, or $3$. It is possible to understand that a path to a particular state y from a previous state z is defined by a permutation of the previous and the particular states z and y.

For the continuous speech recognition system according to this invention, each path is assigned with a set of words $P_{zy}$ according to the permutation of the previous and the particular states z and y descriptive of that path. The reference words $B^c$ should cover the word sets $P_{zy}$'s for all the paths. It is possible to understand that each word set $P_{zy}$ is selected from the reference words $B^c$. For example, the word set $P_{01}$ consists of words "one thousand" to "nine thousand." Each of the word sets $P_{03}$, $P_{13}$, $P_{23}$ consists of words "ten" to "ninety." Each of the word sets $P_{1f}$, $P_{2f}$, and $P_{3f}$ consists of a single word "dollars." It will be presumed in the following that each figure is pronounced in a predetermined manner, such as only /nain/ for "nine."

Figure 5:
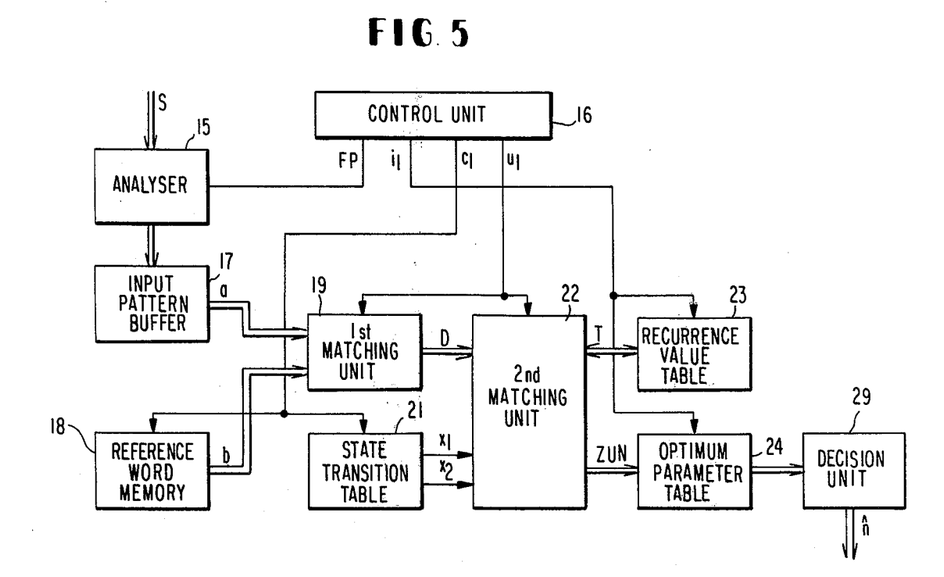
FIG. 5 is a block diagram of a continuous speech recognition system according to a preferred embodiment of this invention.
Figure 6:
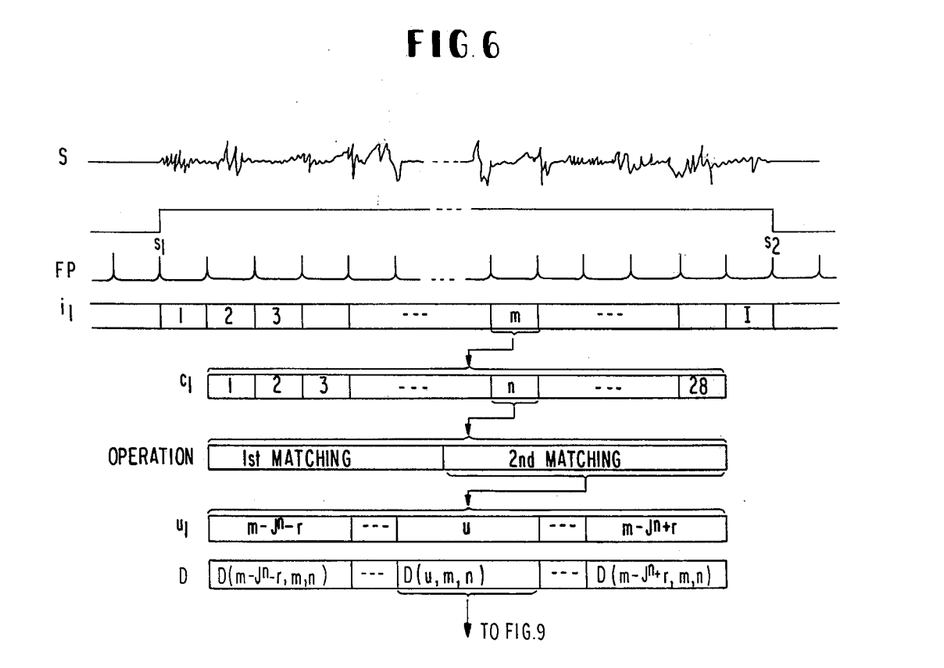
FIG. 6 is a schematic time chart of signals used in the continuous speech recognition system shown in FIG. 5.

Referring now to FIGS. 5 and 6, a continuous speech recognition system according to a preferred embodiment of this invention comprises an analyser 15 responsive to a speech signal S for producing speech start and end signals $s_1$ and $s_2$ (FIG. 6) indicative of substantial beginning and end of the speech signal S. Responsive to the speech start signal $s_1$, a control unit 16 produces various control signals that will become clear as the description proceeds. Among the control signals, a sequence of frame period pulses FP are for making the analyser 15 produce a time sequence of first through I-th input pattern feature vectors $a_i$ as described in connection with Equation (1). At least a predetermined number of input pattern feature vectors $a_i$ are temporarily held in an input pattern buffer 17 at a time. The analyser 15 may be the input unit described in U.S. Pat. No. 3,816,722 issued to Hiroaki Sakoe, the present applicant, et al, assignors to the present assignee, with reference to FIG. 16. The speech signal S should represent a word sequence pronounced in compliance with a regular grammar defined by a state transition diagram for an initial state $S_O$ and a finite sequence of possible states x. The finite sequence next follows the initial state $S_O$.

The control unit 16 comprises a counter (not shown) for counting the frame period pulses FP from the instant of appearance of the speech start signal $s_1$ to produce a frame number signal $i_1$ representative of successive frame periods or instants i. When the frame number signal $i_1$ indicates a particular frame period or instant m, input pattern feature vectors covering a group of fragmentary patterns A(u, m)'s having a common end point in the particular frame period m and a plurality of start points in previous frame periods u's in the interval (3), are held in the input pattern buffer 17. A reference word memory 18 is for memorizing first through N-th reference words $B^c$ (c=1, 2, ..., N), each given by a time sequence of first through $J^n$-th (n being representative of each of c) reference word feature vectors $b_j^n$ as described in connection with Equation (2). During the particular frame period m, the control unit produces a reference word specifying signal $c_1$ for successively specifying the reference words $B^c$ in a predetermined order. Responsive to the reference word specifying signal $c_1$, the reference word memory 18 produces the reference word feature vectors $b_j^n$ of the specified reference word $B^n$. By way of example, the reference word specifying signal $c_1$ sequentially takes the values 1 through 28 to specify the reference words $B^c$ as (1: ten), (2: twenty), (3: thirty), ..., (9: ninety), (10: one hundred), (11: two hundred), (12: three hundred), ..., (18: nine hundred), (19: one thousand), (20: two thousand), (21: three thousand), ..., (27: nine thousand), and (28: dollars).

During a former half of an interval during which each reference word $B^n$ is specified, a first matching unit 19 calculates a subgroup of similarity measures D(u, m, n)'s between the fragmentary patterns A(u, m)'s and the reference word $B^n$ being specified. The first matching unit 19 may be the similarity calculator described in U.S. Pat. No. 4,049,913 issued to Hiroaki Sakoe, the present applicant and assignor to the present assignee. During a latter half of the above-mentioned interval, the control unit 16 produces a start point specifying signal $u_1$ successively specifying the start points or previous frame periods u's. Merely for brevity of description, let the start points u's be specified in the ascending order. The first matching unit 19 successively produces elementary similarity measures $D(m-J^n-r, m, n), \ldots, D(u, m, n), \ldots$, and $D(m-J^n+r, m, n)$ of the subgroup.

Figure 7:
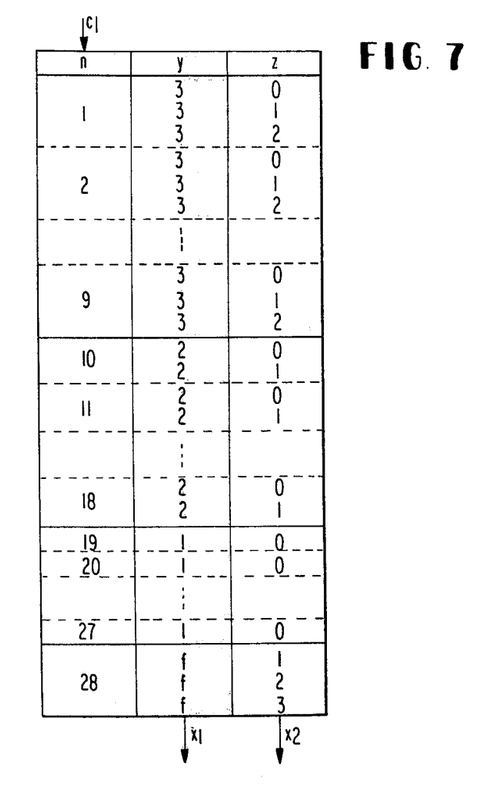
FIG. 7 diagrammatically shows memory sectors and memory locations of a state transition table used in the continuous speech recognition system depicted in FIG. 5.

Turning temporarily to FIG. 7, a state transition table 21 comprises a plurality of memory sectors accessible by the respective reference words $B^c$ or, more particularly, by the respective values of the reference word specifying signal $c_1$. In connection with the example being illustrated, it should be noted that the possible states x are in one-to-one correspondence to the word sets $P_{zy}$'s regardless of the previous state z's and that the reference words $B^c$ are distributed over the word sets $P_{zy}$'s. The possible states x are therefore memorized in the memory sectors accessible by the reference words of the respective word sets $P_{zy}$'s as the particular states y's. When a reference word $B^n$ in a word set $P_{zy}$ is specified by the reference word specifying signal $c_1$, the automaton is in the particular state y memorized in the memory sector specified by that reference word $B^n$. Again in the example being illustrated, only one previous state z (or 0) exists for the first possible state x(=1). Each of the other possible states x, including the final one (x=f), is assigned with a plurality of previous states z's. Each of the memory sectors accessible by the reference words except for those belonging to the word set $P_{01}$ assigned to the first possible state x(=1), comprises a plurality of memory locations or cells loaded with the previous state z's for the particular state y memorized in that memory sector.

Figure 8:
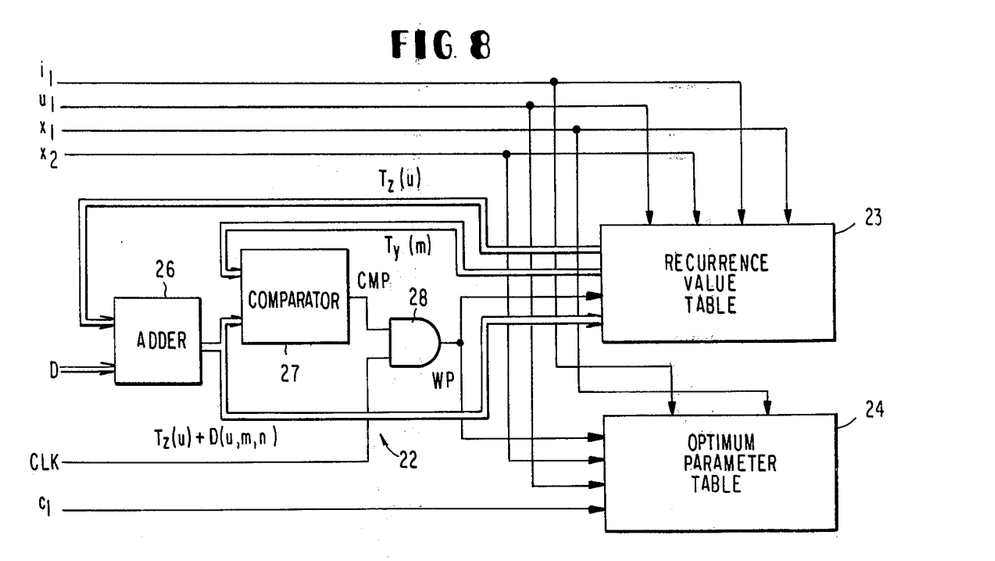
FIG. 8 is a block diagram of an optimum parameter determining unit, a recurrence value table, and an optimum parameter table for use in the continuous speech recognition system illustrated in FIG. 5.
Figure 9:
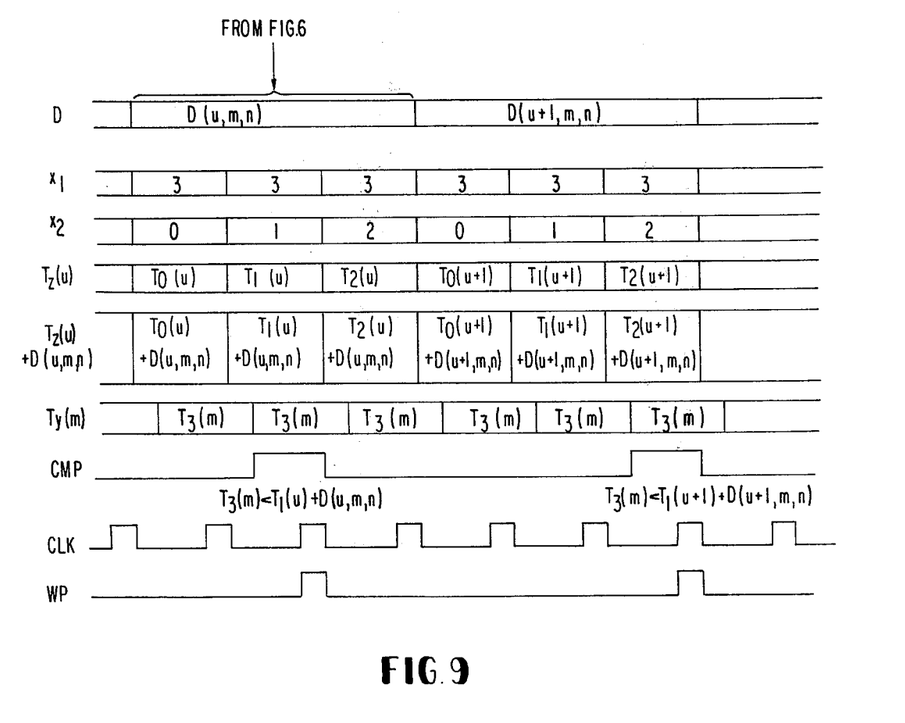
FIG. 9 is a schematic time chart of signals used in connection with the state transition table and the optimum parameter determining unit depicted in FIGS. 7 and 8.

Turning back to FIG. 5 and referring to FIGS. 8 and 9 afresh, the elementary similarity measures $D(m-j^n-r, m, n), \ldots, D(u, m, n), \ldots$, and $D(m-J^n+r, m, n)$ are successively supplied from the first matching unit 19 to a second matching or optimum parameter determining unit 22 accompanied by a recurrence value table 23 and an optimum parameter table 24. During the time that each elementary similarity measure D(u, m, n) is produced by the first matching unit 19, the state transition table 21 supplies the second matching unit 22 with the particular state y and successively with the previous states z's from the memory sector specified by the reference word $B^n$ used in calculating that elementary similarity measure D(u, m, n). The particular and the previous states y and z's are specified by first and second state specifying signals $x_1$ and $x_2$, respectively. The first and the second state specifying signals $x_1$ and $x_2$ are of a common nature in that each thereof specifies a state in the state transition diagram exemplified in FIG. 4. In FIG. 9, it is assumed that the reference word $B^n$ being specified is one in the word sets $P_{03}$, $P_{13}$, and $P_{23}$.

As described hereinabove, the word sequence under consideration would be an optimum concatenation of optimum reference words n(x). According to this invention, x represents optimum ones of the serial numbers 1, 2, 3, ..., and f. More specifically, a concatenation of optimum partial recognition results may, for example, be $\hat{n} < \hat{u}(0), \hat{u}(1) >$ or $\hat{n} < 0, \hat{u}(1) >$, $\hat{n} < \hat{u}(1), \hat{u}(3) >$, and $\hat{n} < \hat{u}(3), u(f) >$ or $\hat{n} < \hat{u}(3), I >$. Reference words n(x) of the optimum concatenation should be selected from the reference words belonging to the word sets $P_{zy}$'s allotted to the possible states having the optimum serial numbers.

It is very desirable to apply the technique of dynamic programming to decision of an optimum concatenation of optimum reference words $\hat{n}(x)$ for the word sequence under consideration. A recurrence value $T_y(m)$ for each frame period or instant m and each particular state y is therefore calculated according to a recurrence formula:

$$T_y(m) = \min_{z, u, n} [T_z(u) + D(u, m, n)], \tag{6}$$

where $n \in P_{zy}$. It is possible to calculate the recurrence formula (6) with the reference words $B^n$'s successively selected from the word sets $P_{zy}$'s assigned specifically to the particular state y. Under the circumstances, the sums of previous recurrence values $T_z(u)$'s and the respective ones of the elementary similarity measures D(u, m, n)'s are minimized for various start points u's in the interval (3) and for at least one previous state z for that particular state y. The initial conditions for the recurrence formula (6) are:

$$T_O(0) = 0$$

and $$T_z(u) = \infty$$

for u=0 and z≠0 and for u≠0 and z=0. The initial conditions are for making the automaton always vary its states from the initial state $S_O$ (z=0). Iterative calculation of the recurrence formula (6) eventually reaches an ultimate recurrence value $T_f(I)$ such that:

$$T_f(I) = \min_{u(x), n(x)} \left[ \sum_x D(u(x-1), u(x), n(x)) \right],$$

where the reference words $B^n$'s are denoted by n(x) as the x-th reference words in each of various concatenations that is not contradictory to a concatenation of reference words selected from the respective word sets $P_{zy}$'s assigned to the possible states x in which the automaton is consecutively selectively put. The start and the end points u and m of each of the reference words n(x) in the concatenations are represented by u(x−1) and u(x).

What is actually required is not the ultimate recurrence value $T_f(I)$ but the optimum concatenation of optimum reference words $\hat{n}(x)$. A set of those optimum ones of the parameters z, u, and n at which the minimum of the sums is decided according to the recurrence formula (6), is therefore determined during each step of the iterative calculation. The optimum parameters of each set will be designated by $Z_y(m)$, $U_y(m)$, and $N_y(m)$ or collectively by $ZUN_y(m)$. Such sets of optimum parameters $ZUN_y(m)$'s are stored in the optimum parameter table 24. When expressed by an equation, each optimum parameter set $ZUN_y(m)$ is determined according to:

$$ZUN_y(m) = \arg \min_{z, u, n} [T_z(u) + D(u, m, n)]. \quad (7)$$

Figure 10:
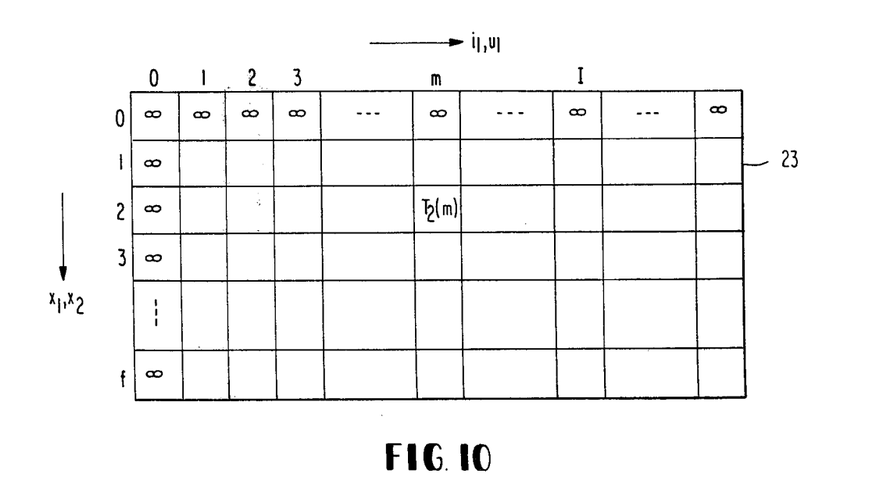
FIG. 10 diagrammatically shows memory locations of the recurrence value table illustrated in FIG. 8.

Referring to FIG. 10 for a short while, the recurrence value table 23 comprises a plurality of ordinary memory locations two dimensionally accessible by the frame number signal $i_1$ and the first state specifying signal $x_1$. The number of memory locations accessible by the frame number signal $i_1$ should be at least equal to the frame numbers of the longest possible one of various input pattern lengths I's. Inasmuch as the start points u's are specified by the frame number signal $i_1$ at previous frame periods or instants preceding each frame period m under consideration, it is possible to use the start point specifying signal $u_1$ in place of the frame number signal $i_1$. Likewise, the second state specifying signal $x_2$ may be used in place of the first state specifying signal $x_1$. The table 23 comprises a plurality of additional memory locations for $u_1=0$ (for a start point $u=0$) and for $x_2=0$ (for the initial state $S_O$ used as a previous state). As the initial conditions, the memory locations accessible by $u_1=0$ and $x_2=0$ is loaded with a signal representative of zero and each of the remaining additional memory locations, with a signal representative of a sufficiently large value ($\infty$). It is preferred that each ordinary memory location be reset to a sufficiently large initial value at least before transition takes place from the initial state $S_O$ to a certain one of the possible states x. As the recurrence formula (6) is calculated, the ordinary memory locations are loaded with the recurrence values $T_y(m)$'s from the left to the right and, in each column where $i_1=m$, in the order dependent on the sequence of particular states y's specified by the first state specifying signal $x_1$.

The optimum parameter table 24 is similar in structure. The additional memory locations are unnecessary. This is because Equation (7) is calculated only for $z \geq 1$ and $u \geq 1$.

Referring more specifically to FIGS. 8 and 9, the start point specifying signal $u_1$ makes the first matching unit 19 successively supply an adder 26 with the elementary similarity measures D(u, m, n)'s (also in FIG. 6) for various fragmentary patterns A(u, m)'s having a common end point in the particular frame period m and for the reference word $B^n$ being specified. During the time that a particular start point u is specified so that the adder 26 is supplied with a particular elementary similarity measure D(u, m, n), the second state specifying signal $x_2$ makes the recurrence value table 23 successively supply the adder 26 with the previous recurrence values $T_z(u)$'s from the memory locations for the particular start point u and for various previous states z's for the particular state y assigned to the reference word $B^n$ under consideration.

Responsive to the frame number signal $i_1$ (FIG. 6) and the first state specifying signal $x_1$, the recurrence value table 23 supplies a comparator 27 with a read-out recurrence value $T_y(m)$ is timed relation to each previous recurrence value $T_z(u)$. The read-out recurrence value $T_y(m)$ has the sufficiently large initial value at first when a new frame period m and a new particular state y are specified by the frame number and the first state specifying signals $i_1$ and $x_1$. During read out of the read-out recurrence value $T_y(m)$, the adder 26 calculates a sum of the above-mentioned previous recurrence value $T_z(u)$ and the particular elementary similarity measure D(u, m, n) and delivers the sum to the comparator 27 and back to the recurrence value table 23.

The comparator 27 supplies an AND gate 28 with a comparison signal CMP indicative of logic "1" and "0" when the sum is less than the read-out recurrence value $T_y(m)$ and not, respectively. The control unit 16 delivers a sequence of clock pulses CLK (not shown in FIG. 5) to the AND gate 28 before the second state specifying signal $x_2$ is switched to indicate another previous state z. The AND gate 28 therefore supplies a write-in pulse WP to the recurrence value table 23 only when the sum is less than the read-out recurrence value $T_y(m)$. If produced, the write-in pulse WP substitutes the sum for the read-out recurrence value $T_y(m)$ as a new recurrence value $T_y(m)$ calculated according to the recurrence formula (6) for the previous state z used in production of the above-described each previous recurrence value $T_z(u)$, for the particular start point u, and for the reference word $B^n$ being specified.

The write-in pulse WP is supplied also to the optimum parameter table 24 to write the second state specifying signal $x_2$, the start point specifying signal $u_1$, and the reference word specifying signal $c_1$ as the optimum parameters $Z_y(m)$, $U_y(m)$, and $N_y(m)$ of a set in the corresponding memory location for $i_1=m$ and $x_1=y$. The optimum parameters $N_y(m)$, $U_y(m)$, and $Z_y(m)$ therefore represent an optimum reference word $\hat{n}(m)$ for a fragmentary pattern A(u, m) having an end point at the particular frame period m and an optimum start point $\hat{u}$, the optimum start point $\hat{u}$, and an optimum previous state $\hat{z}$ for the particular state y allotted to the optimum reference word $\hat{n}(m)$.

With the previous states z's successively specified for the particular state point u, the read-out recurrence value $T_y(m)$ is compared with the sums of the previous recurrence values $T_z(u)$'s and the particular elementary similarity measure D(u, m, n). With the start point u varied within the interval (3), the read-out recurrence value $T_y(m)$ is compared with the sums for the reference word $B^n$ and the particular state y, both being specified. When another reference word $B^{n'}$ is specified by the reference words specifying signal $c_1$, the comparison is repeated for the other reference word $B^{n'}$ with the particular state y kept as before and varied to another particular state y' according as the other reference word $B^{n'}$ belongs to the same word sets $P_{zy}$'s and different word sets $P_{zy'}$'s, respectively. After all reference word $B^c$ are successively specified, operation of the first and the second matching units 19 and 22 is complete up to the particular frame period m.

Let it be assumed that the reference words $B^c$ are specified from the top to the bottom in FIG. 7 and that the actually spoken word sequence is "nine thousand fifty dollars." Merely by way of example, the end points of the fragmentary patterns for "nine thousand," "fifty," and "dollars" be at $i_1=40$, 60, and 80 although not known before recognition of the word sequence. A first write-in pulse WP is produced when the frame period is counted up to 40 and when the reference word specifying signal $c_1$ takes the value of 27 with the first state specifying signal $x_1$ made to specify $y=1$ after having specified $y=3$ and 2 as exemplified in FIG. 7. A second write-in pulse WP is produced when the frame period is further counter up to 60 and when the reference word specifying signal $c_1$ takes the value of 5 with the third possible state $S_3$ specified by the state transition table 21. A third write-in pulse WP is produced when the frame period is eventually counted up to 80 and when the reference word specifying signal $c_1$ takes the value of 28 with the first state specifying signal $x_1$ and to specify $y=1$ following $y=3$, 2, and 1. New recurrence values $T_y(m)$'s equal to zero are stored in the recurrence value table 23 at memory locations for $i_1=40$ and $x_1=1$, $i_1=60$ and $x_1=3$, and $i_1=80$ and $x_1=f$. Sets of optimum parameters $ZUN_y(m)$'s stored in the corresponding memory locations of the optimum parameter table 24 are $x_2=0$, $u_1=0$, and $c_1=27$, $x_2=1$, $u_1=40$, and $c_1=5$, and $x_2=3$, $u_1=60$, and $c_1=28$.

Pertinent memory locations of the recurrence value and the optimum parameter tables 23 and 24 are thus loaded with new recurrence values $T_y(m)$'s and optimum parameter sets $ZUN_y(m)$'s when the second state specifying signal $x_2$ specifies all the previous states $z$'s for the particular state $y$ assigned to a reference word finally specified by the reference word specifying signal $c_1$ with the frame periods counted up to I. Determination of the optimum parameter sets $ZUN_y(m)$'s is now complete. When the frame number signal $i_1$ specifies the input pattern end point I, the speech end pulse $s_2$ appears.

Figure 11:
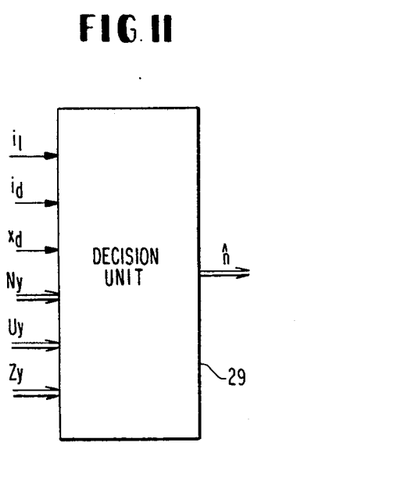
FIG. 11 is a block diagram of a deciding unit for use in the continuous speech recognition system shown in FIG. 5.

Referring finally to FIG. 11, a decision or selection unit 29 (depicted also in FIG. 5) is for deciding an optimum concatenation of reference words n(x) as the word sequence in question, with reference to the optimum parameter sets $ZUN_y(m)$'s stored in the optimum parameter table 24. The decision unit 29 may be a microprocessor of the type described in, for example, "The Am2900 Family Data Book" published 1976 by Advanced Micro Devices, Inc., Calif., with reference to FIG. 1 (page 7).

More specifically, the decision unit 29 is supplied with the frame number signal $i_1$ when the speech end signal $s_2$ is produced. The frame period I indicated by the frame number signal $i_1$ is set in a first register (not shown) included in the microprocessor. The first register supplies the optimum parameter table 24 with a segmentation point specifying signal $i_d$, which can be used in specifying the memory locations in place of the frame number signal $i_1$. The segmentation point specifying signal $i_d$ specifies at first the input pattern end point I or the $\hat{k}$-th optimum segmentation point $\hat{u}(\hat{k})$. The use of the state transition diagram makes the $\hat{k}$-th optimum reference word $\hat{n}(\hat{k})$ to be selected from the reference words in the word sets $P_{1f}$, $P_{2f}$, and $P_{3f}$ allotted to the final possible state $S_f$. The final possible state $x=f$ is therefore set in a second register (not shown) comprised by the microprocessor. The second register supplies the optimum parameter table 24 with an optimum state specifying signal $x_d$, which can be used in specifying the memory locations in place of the first state specifying signal $x_1$. In cooperation with the $\hat{k}$-th optimum segmentation point $\hat{u}(\hat{k})$, the final possible state $x=f$ gives the initial conditions $i_d=I$ and $x_{d=f}$ for decision of the optimum concatenation of optimum reference words $\hat{n}(x)$.

Responsive to the segmentation point and optimum state specifying signals $i_d$ and $x_d$, the optimum parameter table 24 supplies the microprocessor with a set of optimum start point and optimum previous state $U_f(I)$ and $Z_f(I)$ through signal lines $U_y$ and $Z_y$ as the (k-1)-th segmentation point $\hat{u}(\hat{k}-1)$ and a next previous particular state $\hat{y}$, which are set in the first and the second registers, respectively. A $\hat{k}$-th optimum reference word $\hat{n}(\hat{k})$ or $N_f(I)$ is also supplied to the microprocessor through a signal line $N_y$ and produced therefrom as a final word of the word sequence in question through an output signal line $\hat{n}$. The process of selection of the optimum parameter sets $ZUN_y(m)$'s from the optimum parameter table 24 is repeated until a zero is read out as the previous state z, when the optimum concatenation of reference words $\hat{n}(x)$ is decided by the microprocessor in the reversed order.

Summarizing, the decision unit 29 carries out decision of the optimum concatenation or selection of the optimum reference words by setting a pair of conditions $i_d$ and $x_d$ at first at initial conditions $i_d=I$ and $x_d=f$, reading the final optimum reference word $\hat{n}(\hat{k})$ from the optimum parameter table 24 by the use of the conditions $i_d$ and $x_d$, renewing the conditions $i_d$ and $x_d$ to the optimum start point $U_f(I)$ and the optimum previous state $Z_f(I)$ simultaneously read out, and repeating read out of the optimum parameter sets $ZUN_y(m)$'s and renewal of the conditions $i_d$ and $x_d$ until a zero is read out as the optimum previous state $Z_y(m)$.

While this invention has so far been described in connection with a specific embodiment thereof, it is now clearly possible to implement this invention as various other embodiments without departing from the spirit thereof. For example, the state transition diagram may have a plurality of final possible states and one or more loops. Under the circumstances, the content of the state transition table 21 and the program stored in the microprocessor should be modified accordingly. When the diagram has two final possible states $S_f$ and $S_k$, the decision unit 29 should compare at first the recurrence values $T_y(I)$'s stored in the recurrence value table 23 at memory locations specified by $i_d=I$ and by $x_d=f$ and k. In this manner, the decision should be started from one of a set of final possible states $S_y$'s that is determined according to:

$$y = \arg\min_{y \in F} T_y(I),$$

where F represents final states $S_y$'s of the set.

The state transition table 21 may be loaded with a plurality of state transition diagrams with the recurrence value and the optimum parameter tables 23 and 24 made to comprise a sufficient number of memory locations accessible by the first state specifying signal $x_1$. As described in the above-cited U.S. Pat. No. 4,049,913 in connection with the word number specifier, it is possible to make a continuous speech recognition system comprising such a state transition table 21 automatically select one of the state transition diagrams at a time.

Either a scalar product s(i, j) of an i-th input pattern feature vector $a_i$ and a $j^n$-th reference word feature vector $b_j^n$ of the reference word $B^n$ being specified or any other measure indicative of likelihood between the two feature vectors $a_i$ and $b_j^n$, may be substituted for the distance d(i, j) in Equation (4). Depending on the measure of likelihood, a maximum should be used instead of the minimum in Equations (4) and (5) and like formulae. Various other recurrence formulae are known, which may be substituted for the recurrence formula (5). Equations (6) and (7) may be calculated with the signals $c_1$, $u_1$, $x_1$, and $x_2$ varied in an order diffferent from the order exemplified in FIGS. 6 and 9 as, for example, with the reference words $B^c$ successively varied for a particular start point u.

What is claimed is:

1. A continuous speech recognition system for recognizing a word sequence which is substantially continuously spoken in compliance with a regular grammar and supplied to said system as an input pattern A defined by a time sequence of first through I-th input pattern feature vectors $a_i$ arranged at equally spaced successive instants i (i=1, 2, ..., I), said regular grammar being defined by a state transition diagram for an initial state and a finite sequency of possible states x, said finite sequence next following said initial state, said system comprising:

a reference word memory for memorizing first through N-th reference words $B^c$ (c=1, 2, ..., N), an n-th reference word $B^n$ (n being representative of each of c) being given by a time sequence of first through $J^n$-th reference word feature vectors $b_{j^n}^n$ ($j^n$=1, 2, ..., $J^n$);

similarity measure calculating means for calculating at each instant m (m being representative of each of i) a group of similarity measures D(u, m, c) between a group of fragmentary patterns A(u, m)'s and every one of said reference words $B^c$, said group of fragmentary patterns A(u, m)'s being defined, by said each instant m and a plurality of previous instants u's preceding said each instant m among said successive instants i, as those parts of said input pattern feature vector sequence which consist of (u+1)-th through m-th input pattern feature vectors $a_{u+1}$'s to $a_m$;

a state transition table for memorizing, in connection with a particular y (y being representative of each of x), a previous state z and a set of words $P_{zy}$ for a permutation of said previous and said particular states z and y, said previous state z being each of that at least one of said initial and said possible states x which precedes said particular state y, said word set $P_{zy}$ being preselected from said reference words $B^c$ according to said permutation;

a recurrence value table comprising a plurality of memory locations two dimensionally accessible by said successive instants i and said possible states x;

an optimum parameter table comprising a plurality of memory locations two dimensionally accessible by said successive instants i and said possible states x;

optimum parameter determining means for repeating calculation of a recurrence value $T_y(m)$ and determination of a set of optimum parameters $ZUN_y(m)$ at said each instant m and for said particular state y and storage of said recurrence value $T_y(m)$ and said optimum parameter set $ZUN_y(m)$ in said recurrence value and said optimum parameter tables, respectively, at memory locations accessible by said each instant m and said particular state y, said recurrence value $T_y(m)$ being calculated as a minimum of a plurality of sums of previous recurrence values $T_z(u)$'s and those of similarity measures D(u, m, c) of said group, respectively, which are calculated for the reference words belonging to said word set $P_{zy}$, said previous recurrence values $T_z(u)$'s being calculated at the respective previous instant u's and for the previous state z and stored in said recurrence value table at memory locations accessible by said previous instants u's and said previous state z, said set of optimum parameters $ZUN_y(m)$ being that one each of all the previous state z for said particular state y, said previous instants u's, and the reference words in said word set $P_{zy}$ for which said minimum is calculated; and deciding means for deciding a concatenation of reference words from the reference words stored in said optimum parameter table as said word sequence with reference to the sets of optimum parameters $ZUN_y(m)$'s stored in said optimum parameter table.

* * * * *

UNITED STATES PATENT AND TRADEMARK OFFICE
CERTIFICATE OF CORRECTION

PATENT NO. : 4,326,101                      Page 1 of 2

DATED : April 20, 1982

INVENTOR(S) : Hiroaki Sakoe

It is certified that error appears in the above—identified patent and that said Letters Patent is hereby corrected as shown below:

Column 1, line 65 - change "puint" to -- point --

Column 2, line 9 - change "conveienet" to -- convenient --

Column 3, line 43 - change "cocatenation" to -- concatenation --

Column 5, line 9 - change "or" to -- for -- line 23 - change "flat" to -- first -- line 34 - change "an" to -- in --

Column 9, line 65 - change "n(x)" to -- $\hat{n}(x)$ --

Column 10, line 2 - change "u(f)" to -- $\hat{u}(f)$ -- line 2 - change "n(x)" to -- $\hat{n}(x)$ --

Column 11, line 60 - change "is" to -- in --

UNITED STATES PATENT AND TRADEMARK OFFICE
CERTIFICATE OF CORRECTION

PATENT NO. : 4,326,101
DATED : April 20, 1982
INVENTOR(S) : Hiroaki Sakoe

It is certified that error appears in the above—identified patent and that said Letters Patent is hereby corrected as shown below:

Column 11, line 60 - change "is" to -- in --

Column 12, line 64 - change "counter" to -- counted --

Column 13, line 3 - change "and" (first occurence) to -- made -- line 25 - change "n(x)" to -- $\hat{n}(x)$ --

Column 13, line 62 - change "(k-1)-th" to -- $(\hat{k}-1)$-th --

Column 15, line 29 - after "particular" insert -- state --

Column 16, line 23 - change "instant" to -- instants --

Signed and Sealed this

Tenth Day of August 1982

[SEAL]

Attest:

Attesting Officer

GERALD J. MOSSINGHOFF
Commissioner of Patents and Trademarks